(12) United States Patent
Jones

(10) Patent No.: US 7,600,135 B2
(45) Date of Patent: Oct. 6, 2009

(54) APPARATUS AND METHOD FOR SOFTWARE SPECIFIED POWER MANAGEMENT PERFORMANCE USING LOW POWER VIRTUAL THREADS

(75) Inventor: Darren M. Jones, Los Altos, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 395 days.

(21) Appl. No.: 11/107,489

(22) Filed: Apr. 14, 2005

(65) Prior Publication Data

US 2006/0236135 A1   Oct. 19, 2006

(51) Int. Cl.
G06F 1/00 (2006.01)
G06F 1/26 (2006.01)
G06F 1/32 (2006.01)
G06F 9/46 (2006.01)

(52) U.S. Cl. .................. 713/300; 713/320; 718/100; 718/102

(58) Field of Classification Search .......... 713/300, 713/320; 718/100, 102
See application file for complete search history.

(56) References Cited

U.S. PATENT DOCUMENTS

| | | | | |
|---|---|---|---|---|
| 4,590,553 A * | 5/1986 | Noda | ............... | 713/320 |
| 5,825,674 A * | 10/1998 | Jackson | ............... | 713/321 |
| 5,983,356 A | 11/1999 | Pandey et al. | | |
| 6,367,021 B1 | 4/2002 | Shay | | |
| 6,564,328 B1 * | 5/2003 | Grochowski et al. | ......... | 713/320 |
| 6,586,911 B1 | 7/2003 | Smith et al. | | |
| 6,594,755 B1 | 7/2003 | Nuechterlein et al. | | |
| 6,611,920 B1 * | 8/2003 | Fletcher et al. | ............... | 713/322 |
| 6,662,234 B2 | 12/2003 | Cheng | | |
| 6,710,578 B1 | 3/2004 | Sklovsky | | |
| 6,721,894 B2 | 4/2004 | Maher et al. | | |
| 6,986,066 B2 * | 1/2006 | Morrow et al. | ............... | 713/320 |
| 7,058,824 B2 * | 6/2006 | Plante et al. | ............... | 713/300 |
| 7,069,189 B2 * | 6/2006 | Rotem | ............... | 702/189 |
| 7,111,179 B1 * | 9/2006 | Girson et al. | ............... | 713/300 |
| 2004/0049703 A1 | 3/2004 | Maksimovic et al. | | |
| 2004/0123297 A1 | 6/2004 | Flautner et al. | | |
| 2004/0138833 A1 | 7/2004 | Flynn | | |
| 2004/0138854 A1 | 7/2004 | Flynn | | |
| 2004/0139302 A1 | 7/2004 | Flautner et al. | | |
| 2004/0139361 A1 | 7/2004 | Flynn | | |
| 2005/0076256 A1 * | 4/2005 | Fleck et al. | ............... | 713/320 |
| 2006/0020831 A1 * | 1/2006 | Golla et al. | ............... | 713/300 |
| 2006/0179194 A1 | 8/2006 | Jensen | | |
| 2006/0179274 A1 | 8/2006 | Jones et al. | | |
| 2006/0179276 A1 | 8/2006 | Banerjee et al. | | |
| 2006/0179279 A1 | 8/2006 | Jones et al. | | |
| 2006/0179280 A1 | 8/2006 | Jensen et al. | | |
| 2006/0179283 A1 | 8/2006 | Jensen | | |
| 2006/0179284 A1 | 8/2006 | Jensen et al. | | |
| 2006/0179439 A1 | 8/2006 | Jones et al. | | |
| 2006/0206692 A1 | 9/2006 | Jensen | | |

\* cited by examiner

*Primary Examiner*—Mark Connolly
(74) *Attorney, Agent, or Firm*—Cooley Godward Kronish LLP

(57) ABSTRACT

A processor comprises a software control module specifying a power performance metric. A policy manager is responsive to the software control module. A dispatch scheduler is responsive to the policy manager to operate the processor in accordance with the power performance metric.

22 Claims, 6 Drawing Sheets

Policy Manager (PM) Operation

APPARATUS AND METHOD FOR SOFTWARE SPECIFIED POWER MANAGEMENT PERFORMANCE USING LOW POWER VIRTUAL THREADS

CROSS REFERENCE TO RELATED APPLICATIONS

This application is related to the following Non-Provisional U.S. Patent Applications, each of which is incorporated by reference in its entirety for all purposes:

| Ser. No. (Docket No.) | Filing Date | Title |
|---|---|---|
| 10/684,350 (MIPS.0188-01-US) | Oct. 10, 2003 | MECHANISMS FOR ASSURING QUALITY OF SERVICE FOR PROGRAMS EXECUTING ON A MULTITHREADED PROCESSOR |
| 10/929,342 (MIPS.0189-01-US) | Aug. 27, 2004 | INTEGRATED MECHANISM FOR SUSPENSION AND DEALLOCATION OF COMPUTATIONAL THREADS OF EXECUTION IN A PROCESSOR |
| 10/928,746 (MIPS.0192-00-US) | Aug. 27, 2004 | APPARATUS, METHOD AND INSTRUCTION FOR INITIATION OF CONCURRENT INSTRUCTION STREAMS IN A MULTITHREADING MICROPROCESSOR |
| 10/929,102 (MIPS.0193-00-US) | Aug. 27, 2004 | MECHANISMS FOR DYNAMIC CONFIGURATION OF VIRTUAL PROCESSOR RESOURCES |
| 10/929,097 (MIPS.0194-00-US) | Aug. 27, 2004 | APPARATUS, METHOD, AND INSTRUCTION FOR SOFTWARE MANAGEMENT OF MULTIPLE COMPUTATIONAL CONTEXTS IN A MULTITHREADED MICROPROCESSOR |
| 10/954,988 (MIPS.0195-00-US) | Sep. 30, 2004 | SYNCHRONIZED STORAGE PROVIDING MULTIPLE SYNCHRONIZATION SEMANTICS |
| 10/955,231 (MIPS.0196-00-US) | Sep. 30, 2004 | SMART MEMORY BASED SYNCHRONIZATION CONTROLLER FOR A MULTI-THREADED MULTIPROCESSOR SOC |
| 11/051997 (MIPS.0199-00-US) | Feb. 4, 2005 | BIFURCATED THREAD SCHEDULER IN A MULTITHREADING MICROPROCESSOR |
| 11/051980 (MIPS.0200-00-US) | Feb. 4, 2005 | LEAKY-BUCKET THREAD SCHEDULER IN A MULTITHREADING MICROPROCESSOR |
| 11/051979 (MIPS.0201-00-US) | Feb. 4, 2005 | MULTITHREADING MICROPROCESSOR WITH OPTIMIZED THREAD SCHEDULER FOR INCREASING PIPELINE UTILIZATION EFFICIENCY |
| 11/051998 (MIPS.0201-01-US) | Feb. 4, 2005 | MULTITHREADING PROCESSOR INCLUDING THREAD SCHEDULER BASED ON INSTRUCTION STALL LIKELIHOOD PREDICTION |
| 11/051978 (MIPS.0202-00-US) | Feb. 4, 2005 | INSTRUCTION/SKID BUFFERS IN A MULTITHREADING MICROPROCESSOR |
| 11/087070 (MIPS.0208-00-US) | Mar. 22, 2005 | INSTRUCTION DISPATCH SCHEDULER EMPLOYING ROUND-ROBIN APPARATUS SUPPORTING MULTIPLE THREAD PRIORITIES FOR USE IN MULTITHREADING MICROPROCESSOR |
| 11/086258 (MIPS.0209-00-US) | Mar. 22, 2005 | RETURN DATA SELECTOR EMPLOYING BARREL-INCREMENTER-BASED ROUND-ROBIN APPARATUS |
| 11/087063 (MIPS.0210-00-US) | Mar. 22, 2005 | FETCH DIRECTOR EMPLOYING BARREL-INCREMENTER-BASED ROUND-ROBIN APPARATUS FOR USE IN MULTITHREADING MICROPROCESSOR |

-continued

| Ser. No. (Docket No.) | Filing Date | Title |
|---|---|---|
| 11/087064 (MIPS.0204.00US) | Mar. 22, 2005 | BARREL-INCREMENTER-BASED ROUND-ROBIN APPARATUS AND INSTRUCTION DISPATCH SCHEDULER EMPLOYING SAME FOR USE IN MULTITHREADING MICROPROCESSOR |
| 11/107,492 (MTEC-024/00US) | Apr. 14, 2005 | APPARATUS AND METHOD FOR AUTOMATIC LOW POWER MODE INVOCATION IN A MULTI-THREADED PROCESSOR |

BRIEF DESCRIPTION OF THE INVENTION

The present invention relates generally to power management in a multithreaded processor. More particularly, the invention relates to software control of a multithreaded processor utilizing a policy manager and a dispatch scheduler.

BACKGROUND OF THE INVENTION

Microprocessor designers employ many techniques to increase microprocessor performance. Most microprocessors operate using a clock signal running at a fixed frequency. Each clock cycle the circuits of the microprocessor perform their respective functions. One measure of a microprocessor's performance is the time required to execute a program or collection of programs. From this perspective, the performance of a microprocessor is a function of its clock frequency, the average number of clock cycles required to execute an instruction (or alternately stated, the average number of instructions executed per clock cycle), and the number of instructions executed in the program or collection of programs.

Semiconductor scientists and engineers are continually making it possible for microprocessors to run at faster clock frequencies, chiefly by reducing transistor size, resulting in faster switching times. The number of instructions executed is largely fixed by the task to be performed by the program, although it is also affected by the instruction set architecture of the microprocessor. Architectural and organizational concepts, such as parallelism, have realized large performance increases.

One notion of parallelism that has improved the instructions per clock cycle, as well as the clock frequency, of microprocessors is pipelining, which overlaps execution of multiple instructions within pipeline stages of the microprocessor. In an ideal situation, each clock cycle one instruction moves down the pipeline to a new stage, which performs a different function on the instruction. Thus, although each individual instruction takes multiple clock cycles to complete, because the multiple cycles of the individual instructions overlap, the average number of clock cycles per instruction is reduced. The performance improvements of pipelining may be realized to the extent that the instructions in the program permit it, that is, to the extent that an instruction does not depend upon its predecessors in order to execute and can therefore execute in parallel with its predecessors, which is commonly referred to as instruction-level parallelism. Another way in which instruction-level parallelism is exploited by contemporary microprocessors is the issuing of multiple instructions for execution per clock cycle. These microprocessors are commonly referred to as superscalar microprocessors.

The foregoing discussion pertains to parallelism at the individual instruction-level. However, the performance improvement that may be achieved through exploitation of instruction-level parallelism is limited. Various constraints imposed by limited instruction-level parallelism and other performance-constraining issues have recently renewed an interest in exploiting parallelism at the level of blocks, or sequences, or streams of instructions, commonly referred to as thread-level parallelism. A thread is simply a sequence, or stream, of program instructions. A multithreaded microprocessor concurrently executes multiple threads according to some scheduling policy that dictates the fetching and issuing of instructions of the various threads, such as interleaved, blocked, or simultaneous multithreading. A multithreaded microprocessor typically allows the multiple threads to share the functional units of the microprocessor (e.g., instruction fetch and decode units, caches, branch prediction units, and load/store, integer, floating-point, SIMD, etc. execution units) in a concurrent fashion. However, multithreaded microprocessors include multiple sets of resources, or contexts, for storing the unique state of each thread, such as multiple program counters and general purpose register sets, to facilitate the ability to quickly switch between threads to fetch and issue instructions.

One example of a performance-constraining issue addressed by multithreading microprocessors is that cache misses typically have a relatively long latency. It is common for the memory access time of a contemporary microprocessor-based computer system to be between one and two orders of magnitude greater than the cache hit access time. Instructions dependent upon the data missing in the cache are stalled in the pipeline waiting for the data to come from memory. Consequently, some or all of the pipeline stages of a single-threaded microprocessor may be idle performing no useful work for many clock cycles. Multithreaded microprocessors may solve this problem by issuing instructions from other threads during the memory fetch latency, thereby enabling the pipeline stages to make forward progress performing useful work, somewhat analogously to, but at a finer level of granularity than, an operating system performing a task switch on a page fault. Other examples of performance-constraining issues addressed by multithreading microprocessors are pipeline stalls and their accompanying idle cycles due to a data dependence; or due to a long latency instruction such as a divide instruction, floating-point instruction, or the like; or due to a limited hardware resource conflict. Again, the ability of a multithreaded microprocessor to issue instructions from other threads to pipeline stages that would otherwise be idle may significantly reduce the time required to execute the program or collection of programs comprising the threads.

Increased microprocessor performance achieved through multithreading and other techniques results in increased microprocessor power consumption. Power consumption is a critical factor in many applications. Accordingly, there is an increasing emphasis on power management techniques. Existing techniques focus on voltage and frequency scaling. Many of these techniques are inherent to a processor and therefore are not tunable by a user in an easy manner.

Therefore, it would be highly desirable to provide an improved technique for power management in a multithreaded processor. Such a technique would ideally allow tunable power management through a software interface, thereby facilitating user control of power management. Ideally, such a technique would allow power management through control of individual threads and otherwise provide visibility and control of the power management associated with individual threads.

SUMMARY OF THE INVENTION

The invention includes a processor with a software control module specifying a power performance metric. A policy manager is responsive to the software control module. A dispatch scheduler is responsive to the policy manager to operate the processor in accordance with the power performance metric.

The invention also includes a processor with a software control module specifying a power performance metric. A bifurcated thread scheduler includes an internal processor core component and an external processor core component in direct communication with the software control module. The bifurcated thread scheduler operates the processor in accordance with the power performance metric.

The invention also includes a method of operating a processor. A power performance metric is specified via software control. The power performance metric is responded to at an external processor core component. The power performance metric is implemented with an internal processor core component responsive to the external processor core component.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
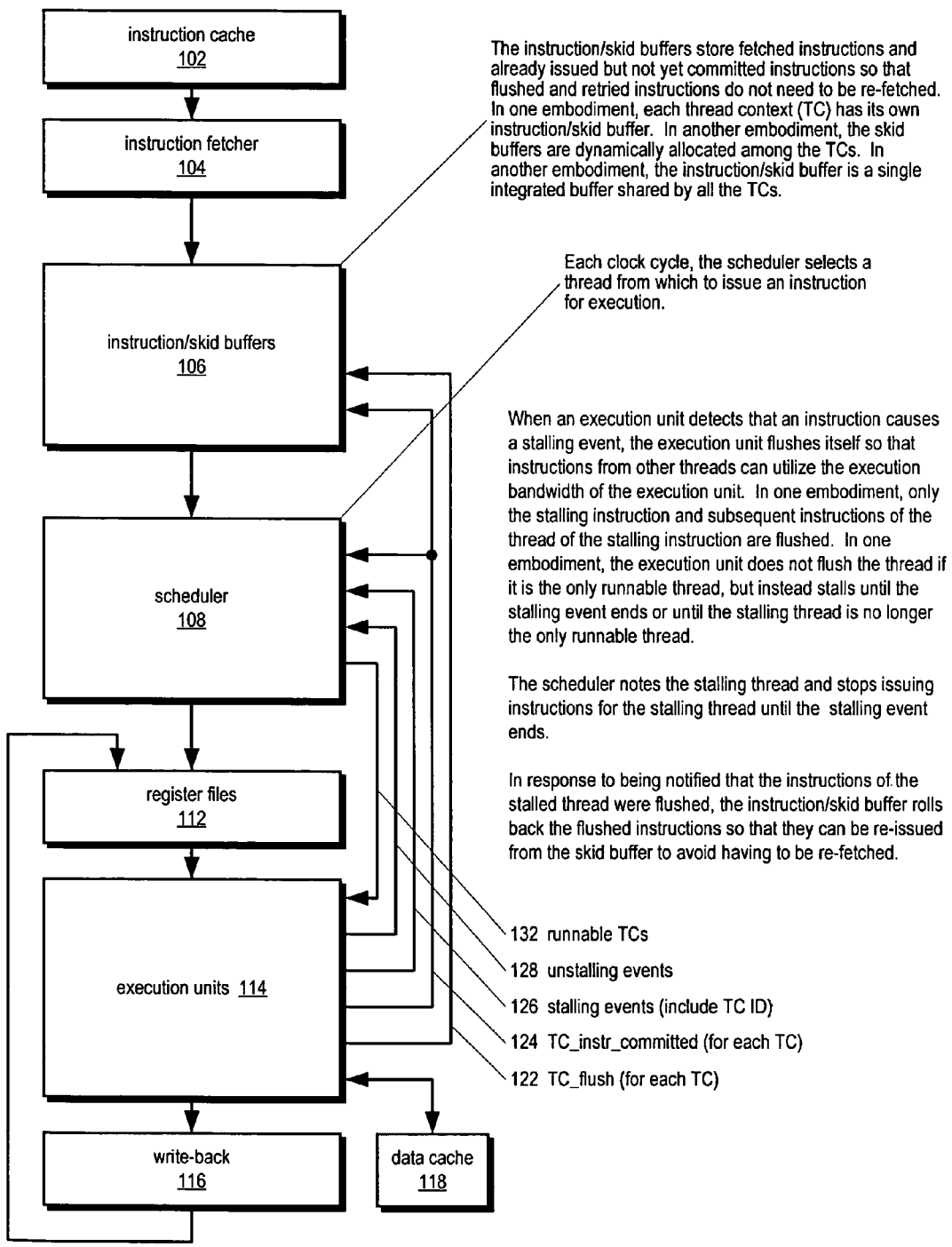
FIG. 1 illustrates a multithreading microprocessor that may be used in accordance with an embodiment of the invention.

FIG. 1 illustrates a pipelined multithreading microprocessor 100 according to an embodiment of the invention. This exemplary multithreading microprocessor 100 is used to disclose concepts of the invention. It should be appreciated that the concepts of the invention may also be applied to alternate multithreading microprocessor designs.

The microprocessor 100 is configured to concurrently execute a plurality of threads. A thread—also referred to herein as a thread of execution, or instruction stream—comprises a sequence, or stream, of program instructions. The threads may be from different programs executing on the microprocessor 100, or may be instruction streams from different parts of the same program executing on the microprocessor 100, or a combination thereof.

Each thread has an associated thread context (TC). A thread context comprises a collection of storage elements, such as registers or latches, and/or bits in the storage elements of the microprocessor 100 that describe the state of execution of a thread. That is, the thread context describes the state of its respective thread, which is unique to the thread, rather than state shared with other threads of execution executing concurrently on the microprocessor 100. By storing the state of each thread in the thread contexts, the microprocessor 100 is configured to quickly switch between threads to fetch and issue instructions. In one embodiment, each thread context includes a program counter (PC), a general purpose register set, and thread control registers, which are included in register files 112 of the microprocessor 100.

The microprocessor 100 concurrently executes the threads according to a scheduling policy that dictates the fetching and issuing of instructions of the various threads. Various embodiments for scheduling the dispatching of instructions from the multiple threads are described herein. The terms instruction "issue" and "dispatch" are used interchangeably herein. The multithreaded microprocessor 100 allows the multiple threads to share the functional units of the microprocessor 100 (e.g., instruction fetch and decode units, caches, branch prediction units, and execution units, such as load/store, integer, floating-point, SIMD, and other execution units) in a concurrent fashion.

The microprocessor 100 includes an instruction cache 102 for caching program instructions—in particular, the instructions of the various threads—fetched from a system memory of a system including the microprocessor 100. The microprocessor 100 also includes an instruction fetcher 104, or instruction fetch pipeline 104, coupled to concurrently fetch instructions of the multiple threads from the instruction cache 102 and/or system memory into instruction/skid buffers 106, coupled to the instruction fetcher 104. In one embodiment, the instruction fetch pipeline 104 includes a four-stage pipeline. The instruction/skid buffers 106 provide instructions to an instruction scheduler 108, or thread scheduler 108. In one embodiment, each thread has its own instruction/skid buffer 106. Each clock cycle, the scheduler 108 selects an instruction from one of the threads and issues the instruction for execution within the execution stages of the microprocessor 100 pipeline. The register files 112 are coupled to the scheduler 108 and provide instruction operands to execution units 114 that execute the instructions. The microprocessor 100 also includes a data cache 118 coupled to the execution units 114. The execution units 114 may include, but are not limited to, integer execution units, floating-point execution units, SIMD execution units, load/store units, and branch execution units.

In one embodiment, the integer execution unit pipeline includes four stages: a register file (RF) access stage in which the register file 112 is accessed, an address generation (AG) stage, an execute (EX) stage, and a memory second (MS) stage. In the EX stage, simple ALU operations are performed (such as adds, subtracts, shifts, etc.). Additionally, the data cache 118 is a two-cycle cache that is accessed during a first clock cycle in the EX stage and is accessed during a second clock cycle in the MS stage. Each thread context includes its own register file 112, and each register file includes its own program counter, general-purpose register set, and thread control registers. The instruction fetcher 104 fetches instructions of the threads based on the program counter value of each thread context. It is noted that some of the execution units 114 may be pipelined, and some extensively. The microprocessor 100 pipeline also includes a write-back stage 116 that writes instruction results back into the register files 112. In one embodiment, the microprocessor 100 pipeline also includes an exception resolution stage coupled between the execution units 114 and the write-back stage 116.

In one embodiment, the execution units 114 generate a TC_instr_committed signal 124 associated with each thread context to indicate that an instruction of the specified thread has been committed for execution. An instruction has been committed for execution if the instruction is guaranteed not to be flushed by the microprocessor 100 pipeline, but instead is committed to eventually complete execution, which generates a result and updates the architectural state of the microprocessor 100. In one embodiment, multiple instructions may be committed per clock cycle, and the TC_instr_committed signals 124 indicate the number of instructions committed for the thread context that clock cycle. The TC_instr_committed signals 124 are provided to the scheduler 108. In response to the TC_instr_committed signal 124, the scheduler 108 updates a virtual water level indicator for the thread that is used by the thread scheduling policy of the scheduler 108 to accomplish required quality-of-service, as described below.

The TC_instr_committed signals 124 are also provided to the respective instruction/skid buffers 106. In response to the TC_instr_committed signal 124, the instruction/skid buffer 106 updates a pointer to effectively remove the instruction from the buffer 106. In a conventional microprocessor, instructions are removed from a conventional instruction buffer and are issued for execution. However, the instruction/skid buffers 106 continue to store instructions after they have been issued for execution. The instructions are not removed from the instruction/skid buffers 106 until the execution units 114 indicate that an instruction has been committed for execution via the respective TC_instr_committed signal 124.

The scheduler 108 provides to the execution units 114 a runnable TCs signal 132. The runnable TCs signal 132 specifies which of the thread contexts are runnable, i.e., which thread contexts the scheduler 108 may currently issue instructions from. In one embodiment, a thread context is runnable if the thread context is active and is not blocked by other conditions (such as being Halted, Waiting, Suspended, or Yielded). In particular, the execution units 114 use the runnable TCs signal 132 to determine whether a stalled thread context is the only runnable thread context for deciding whether or not to flush the instructions of the stalled thread context.

The execution units 114 provide to the scheduler 108 a stalling events signal 126. The stalling events signal 126 indicates that an instruction has stalled, or would have stalled, in an execution unit 114 for the reason specified by the particular stalling event signal 126. In addition, the stalling events signal 126 includes an identifier identifying the thread context of the stalled instruction. The execution units 114 also provide to the scheduler 108 an unstalling events signal 128. In response to the stalling events signal 126, the scheduler 108 stops issuing instructions for the stalled thread context until a relevant unstalling event 128 is signaled.

Examples of events that would cause an execution unit 114 to stall in response to an instruction include, but are not limited to, the following. First, the instruction may be dependent upon unavailable data, such as data from a load instruction that misses in the data cache 118. For example, an add instruction may specify an operand which is unavailable because a preceding load instruction that missed in the data cache 118 and the operand has not yet been fetched from system memory. Second, the instruction may be dependent upon data from a long-running instruction, such as a divide or other long arithmetic instruction, or an instruction that moves a value from a coprocessor register, for example.

Third, the instruction may introduce a conflict for a limited hardware resource. For example, in one embodiment the microprocessor 100 includes a single divider circuit. If the divider is already executing a divide instruction, then a second divide instruction must stall waiting for the first divide instruction to finish. For another example, in one embodiment the microprocessor 100 instruction set includes a group of instructions for performing low-level management operations of the instruction cache 102. If an instruction cache management instruction is already being executed, then a second instruction cache management instruction must stall waiting for the first to finish. For another example, in one embodiment, the microprocessor 100 includes a load queue that includes a relatively small number of slots for storing in-progress data cache 118 refills. When a load instruction misses in the data cache 118, a load queue entry is allocated and a processor bus transaction is initiated to obtain the missing data from system memory. When the data is returned on the bus, it is stored into the load queue and is subsequently written into the data cache 118. When the bus transaction is complete and all the data is written to the data cache 118, the load queue entry is freed. However, when the load queue is full, a load miss causes a pipeline stall.

Fourth, the instruction may follow an EHB instruction. In one embodiment, the microprocessor 100 instruction set includes an EHB (Execution Hazard Barrier) instruction that is used by software to stop instruction execution until all execution hazards have been cleared. Typically, instructions following an EHB instruction will stall in the pipeline until the EHB instruction is retired.

Fifth, the instruction may follow a load or store instruction addressed to inter-thread communication (ITC) space in its same thread context. In one embodiment, the microprocessor 100 supports loads and stores to an ITC space comprising synchronized storage, which can block for arbitrarily long times causing instructions in the same thread context following the ITC load or store to stall.

Conversely, examples of unstalling events 128 include, but are not limited to, the following: load data that missed in the data cache 118 is returned; a limited hardware resource is freed up, such as a divider circuit, the instruction cache 102, or a load queue slot; an EHB instruction, long-running instruction, or load/store instruction to inter-thread communication (ITC) space completes.

The execution units 114 also generate a TC_flush signal 122 associated with each thread context to indicate that the instructions of the specified thread in the execution portion of the pipeline (i.e., portion of the pipeline below the scheduler 108) have been flushed, or nullified. In one embodiment, flushing or nullifying an instruction comprises clearing a valid bit associated with the instruction in the pipeline, which prevents the pipeline from updating the architectural state of the microprocessor 100 in response to results of the instruction. One reason an execution unit 114 may generate a TC_flush signal 122 is when an instruction of a thread would stall in the execution unit 114, as described above. Nullifying or flushing the instruction removes the reason for the instruction to be stalled, since the results generated for the instruction will be disregarded and therefore need not be correct. Advantageously, by flushing the stalling instruction, instructions of other threads may continue to execute and utilize the execution bandwidth of the execution pipeline, thereby potentially increasing the overall performance of the microprocessor 100, as described in more detail below. In one embodiment, only instructions of the stalling thread are flushed, which may advantageously reduce the number of pipeline bubbles introduced by the flush, and in some cases may cause only one bubble associated with the stalling instruction, depending upon the composition of instructions from the various threads present in the execution unit 114 pipeline. In one embodiment, the TC_flush signal 122 indicates that all uncommitted instructions of the thread context have been flushed. In another embodiment, the execution unit 114 may flush fewer than the number of uncommitted instructions present in the execution unit 114, namely the stalling instruction and any newer instructions of the stalling thread context, but not flush uncommitted instructions of the thread context that are older than the stalling instruction. In this embodiment, the TC_flush signal 122 also indicates a number of instructions that were flushed by the execution unit 114.

The TC_flush signals 122 are provided by the execution units 114 to their respective instruction/skid buffers 106. The instruction/skid buffer 106 uses the TC_flush signal 122 to roll back the state of the instructions in the buffer 106. Because the instruction/skid buffers 106 continue to store instructions until they have been committed not to be flushed, any instructions that are flushed may be subsequently re-issued from the instruction/skid buffers 106 without having to be re-fetched from the instruction cache 102. This has the advantage of potentially reducing the penalty associated with flushing stalled instructions from the execution pipeline to enable instructions from other threads to execute. Reducing the likelihood of having to re-fetch instructions is becoming increasingly important since instruction fetch times appear to be increasing. This is because, among other things, it is becoming more common for instruction caches to require more clock cycles to access than in older microprocessor designs, largely due to the decrease in processor clock periods. Thus, the penalty associated with an instruction re-fetch may be one, two, or more clock cycles more than in earlier designs.

Figure 2:
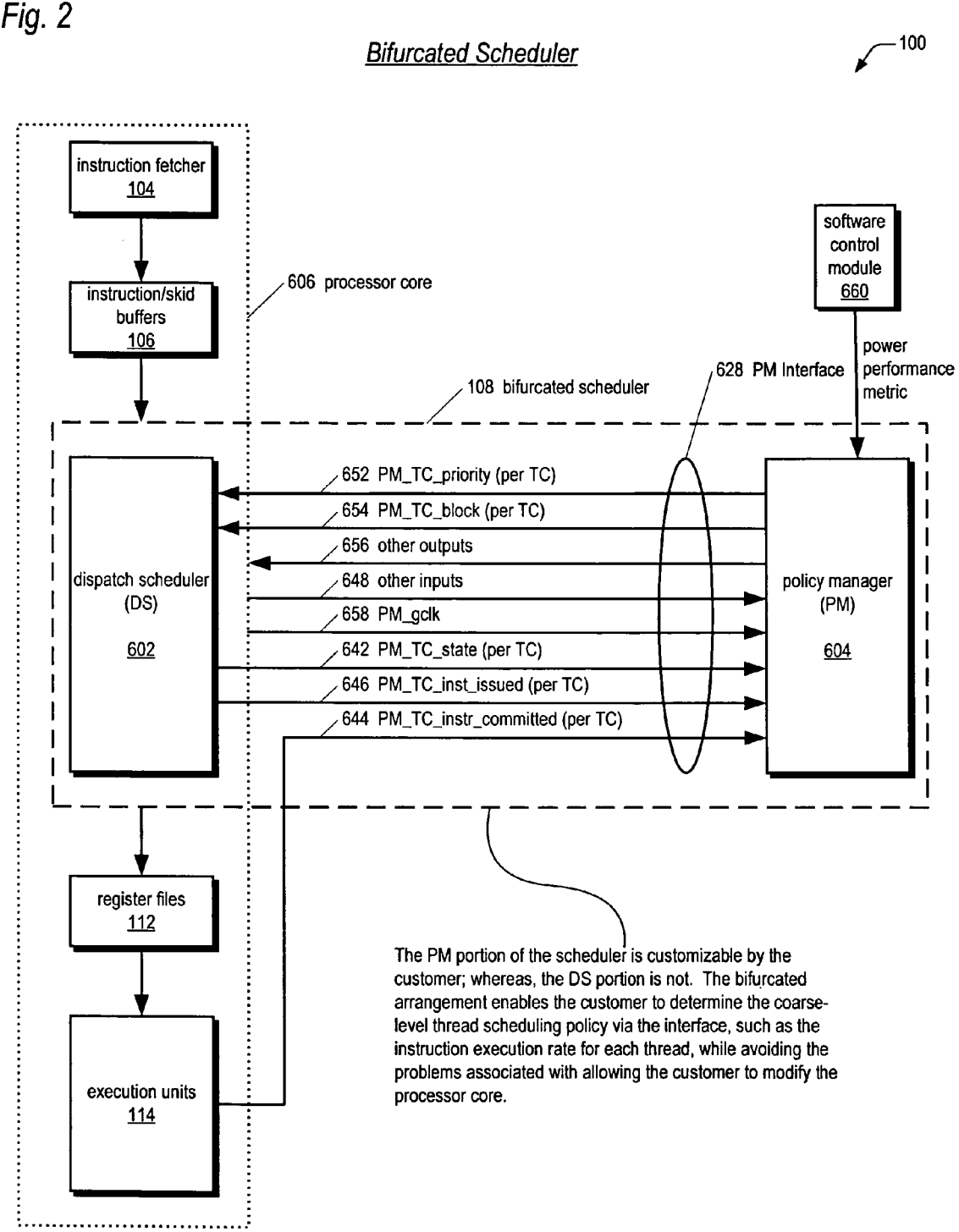
FIG. 2 illustrates a bifurcated scheduler, including a dispatch scheduler and a policy manager, utilized in accordance with an embodiment of the invention.

Referring now to FIG. 2, a block diagram illustrating the scheduler 108 within the microprocessor 100 of FIG. 1 according to one embodiment of the present invention in which the scheduler 108 is bifurcated is shown. The bifurcated scheduler 108 comprises a dispatch scheduler (DS) 602 portion and a policy manager (PM) 604 portion. The dispatch scheduler 602 portion is comprised within a processor core 606 of microprocessor 100; whereas, the policy manager 604 portion is comprised outside of the processor core 606. The processor core 606 is the portion of the microprocessor 100 that is not customizable by the customer; whereas, the policy manager 604 is customizable by the customer. In one embodiment, the processor core 606 is a synthesizable core, also referred to as a soft core. The design of a synthesizable core is capable of being reduced to a manufacturable representation quickly and easily using automated tools, commonly referred to as synthesis tools.

The processor core 606 provides an interface 628 comprising a plurality of signals to the policy manager 604. In one embodiment, the inputs to the dispatch scheduler 602 and output signals from the dispatch scheduler 602 are registered, to advantageously enable the non-core policy manager 604 logic to interface with the processor core 606 in a manner that alleviates certain timing problems that might be otherwise introduced by a bifurcated scheduler. Furthermore, the interface 628 is easy for the customer to understand, which eases the design of the policy manager 604 scheduling policy.

In Table 1 below, the various signals comprising the policy manager interface 628 according to one embodiment are shown. Table 1 specifies the signal name, the direction of the signal relative to the policy manager 604, and a brief description of each signal. Table 1 describes an embodiment in which the microprocessor 100 includes nine thread contexts for storing state associated with up to nine threads of execution. Furthermore, the embodiment enables the microprocessor 100 to be configured as up to two virtual processing elements (VPEs). In one embodiment, the microprocessor 100 substantially conforms to a MIPS32 or MIPS64 Instruction Set Architecture (ISA) and includes a control Coprocessor 0, referred to in Table 1 as CP0, which includes thread control registers substantially conforming to a Coprocessor 0 specified in the MIPS Privileged Resource Architecture (PRA) and the MIPS Multithreading Application Specific Extension (MT ASE). Several of the signals described in Table 1 are used to access CP0 registers.

TABLE 1

| Signal Name | Direction | Description | |
|---|---|---|---|
| PM_gclk | Input | Processor Clock | |
| PM_gfclk | Input | Free running Processor Clock | |
| PM_greset_pre | Input | Global Reset. Register before use. | |
| PM_gscanenable | Input | Global Scan Enable. | |
| PM_vpemap[8:0] | Input | Assignment of TCs to VPEs | |
| | | Encoding | Meaning |
| | | 1#0 | TC belongs to VPE 0 |
| | | 1#1 | TC belongs to VPE 1 |
| PM_cp0_reg_ex | Input | Register number for CP0 read. | |
| PM_cp0_sel_ex | Input | Register select for CP0 read. | |
| PM_cp0_rvpe_ex | Input | VPE select for CP0 read. | |
| PM_cp0_rtc_ex | Input | TC select for CP0 read. | |
| PM_cp0_run_ex | Input | Clock Enable for register holding PM_cp0_rdata_ms. | |
| PM_cp0_rdata_ms | Output | CP0 read data. Input to hold register controlled by PM_cp0_run_ex should be zero when PM CP0 registers not selected. | |

TABLE 1-continued

| Signal Name | Direction | Description |
|---|---|---|
| PM_cp0_wr_er | Input | CP0 register write strobe. |
| PM_cp0_reg_er | Input | Register number for CP0 write. |
| PM_cp0_sel_er | Input | Register select for CP0 write. |
| PM_cp0_wvpe_er | Input | VPE select for CP0 write. |
| PM_cp0_wtc_er | Input | TC select for CP0 write. |
| PM_cp0_wdata_er | Input | CP0 write data. |
| PM_vpe_dm[1:0] | Input | Debug Mode. DM bit of the CP0 Debug Register for the two VPEs. |
| PM_vpe_exl[1:0] | Input | Exception Level. EXL bit of the CP0 Status Register for the two VPEs. |
| PM_vpe_erl[1:0] | Input | Error Level. ERL bit of the CP0 Status Register for the two VPEs. |
| PM_tc_state_0[2:0] | Input | State of TC 0. <br> Encoding  Meaning <br> 3#000  InActive. <br> 3#001  Active. <br> 3#010  Yielded. <br> 3#011  Halted. <br> 3#100  Suspended. <br> 3#101  Waiting on ITC. <br> 3#110  WAITing due to WAIT. <br> 3#111  Used as SRS. |
| PM_tc_state_1[2:0] | Input | State of TC 1. See PM_tc_state_0 for encoding. |
| PM_tc_state_2[2:0] | Input | State of TC 2. See PM_tc_state_0 for encoding. |
| PM_tc_state_3[2:0] | Input | State of TC 3. See PM_tc_state_0 for encoding. |
| PM_tc_state_4[2:0] | Input | State of TC 4. See PM_tc_state_0 for encoding. |
| PM_tc_state_5[2:0] | Input | State of TC 5. See PM_tc_state_0 for encoding. |
| PM_tc_state_6[2:0] | Input | State of TC 6. See PM_tc_state_0 for encoding. |
| PM_tc_state_7[2:0] | Input | State of TC 7. See PM_tc_state_0 for encoding. |
| PM_tc_state_8[2:0] | Input | State of TC 8. See PM_tc_state_0 for encoding. |
| PM_tc_ss[8:0] | Input | Single Stepping. SSt bit of the Debug Register for the 9 TCs. |
| PM_tc_inst_issued[8:0] | Input | Instruction issued by Dispatch Scheduler. |
| PM_tc_instr_committed[8:0] | Input | Instruction committed. |
| PM_tc_fork[8:0] | Input | FORK instruction has created a new TC. PM_tc_instr_committed contains which TC executed the FORK. |
| PM_tc_priority_0[1:0] | Output | Priority of TC 0. |
| PM_tc_priority_1[1:0] | Output | Priority of TC 1. |
| PM_tc_priority_2[1:0] | Output | Priority of TC 2. |
| PM_tc_priority_3[1:0] | Output | Priority of TC 3. |
| PM_tc_priority_4[1:0] | Output | Priority of TC 4. |
| PM_tc_priority_5[1:0] | Output | Priority of TC 5. |
| PM_tc_priority_6[1:0] | Output | Priority of TC 6. |
| PM_tc_priority_7[1:0] | Output | Priority of TC 7. |
| PM_tc_priority_8[1:0] | Output | Priority of TC 8. |
| PM_tc_block[8:0] | Output | Prevent Dispatch Scheduler from issuing instructions for selected TCs. |
| PM_vpe_relax_enable[1:0] | Output | Relax function Enabled for the two VPEs. |
| PM_vpe_relax_priority_0[1:0] | Output | Relax Priority of VPE 0. |
| PM_vpe_relax_priority_1[1:0] | Output | Relax Priority of VPE 1. |
| PM_vpe_exc_enable[1:0] | Output | Exception function Enabled for the two VPEs. |
| PM_vpe_exc_priority_0[1:0] | Output | Exception Priority of VPE 0. |
| PM_vpe_exc_priority_1[1:0] | Output | Exception Priority of VPE 1. |

Some of the particular signals of the policy manager interface 628 specified in Table 1 will now be described in more detail. The policy manager 604 specifies to the dispatch scheduler 602 the priority of the respective thread context via the PM_TC_priority 652 output. In one embodiment, the PM_TC_priority 652 comprises two bits and the dispatch scheduler 602 allows the policy manager 604 to specify one of four different priorities for a thread context. The policy manager 604 instructs the dispatch scheduler 602 to stop issuing instructions for a thread context by generating a true value on the respective PM_TC_block 654 output. Thus, the policy manager 604 may affect how the dispatch scheduler 602 issues instructions for the various thread contexts via the PM_TC_priority 652 and PM_TC_block 654 outputs.

The processor core 606 provides the PM_gclk 658 to the policy manager 604, which enables the policy manager 604 to adjust the PM_TC_priority 652 periodically based on the PM_gclk 658. The dispatch scheduler 602 communicates the state for each thread context via respective PM_TC_state 642 input. As shown in Table 1, a thread context may be in one of eight states as follows. InActive: the dispatch scheduler 602 may not issue instructions of the thread context because the thread context is not currently associated with a thread of execution. Active: the thread context is currently associated with a thread of execution; therefore, the dispatch scheduler 602 may issue instructions of the thread context for execution if no other blocking conditions are present. Yielded: the dispatch scheduler 602 may not issue instructions of the thread context for execution because the thread has executed a YIELD instruction, which causes the thread context to be blocked on a specified event. Halted: the dispatch scheduler may not issue instructions of the thread context for execution because the thread context has been halted by itself or by another thread. Suspended: the dispatch scheduler 602 may not issue instructions of the thread context for execution because the thread executed a DMT or DVPE instruction, or because the microprocessor 100 or VPE is currently servicing an exception. A DMT instruction suspends multithreading operation for the VPE. A DVPE instruction suspends multithreading operation for the entire microprocessor 100. Waiting on ITC: the dispatch scheduler 602 may not issue instructions of the thread context for execution because the thread context is blocked waiting to load/store data from/to a location in inter-thread communication (ITC) space specified by a load/store instruction executed by the thread. Waiting due to WAIT: the dispatch scheduler 602 may not issue instructions of the thread context for execution because the thread has executed a WAIT instruction, which causes the thread context to be blocked until an interrupt has occurred. Used as SRS: the dispatch scheduler 602 may not issue instructions of the thread context because the thread context is not and cannot be associated with a thread of execution because the thread context register set is used for shadow register set operation.

The dispatch scheduler 602 communicates to the policy manager 604 that it has issued an instruction for a thread context via a respective PM_TC_inst_issued 646 input. The execution units 114 communicate to the policy manager 604 that they have committed an instruction of a thread context via a respective PM_TC_instr_committed 644 input. In one embodiment, the PM_TC_instr_committed 644 signal indicates execution of the instruction has been completed. In another embodiment, the PM_TC_instr_committed 644 signal indicates the instruction is guaranteed not to be flushed, i.e., to eventually complete execution, but may not have yet been completed. The salient point is that the PM_TC_instr_committed 644 input provides to the policy manager 604 information about executed instructions as opposed to merely dispatched instructions (as communicated by the PM_TC_inst_issued input 646), which may be different since some instructions may be speculatively dispatched and never complete. This may be an important distinction to the policy manager 604 since some threads in an application may require a particular quality-of-service. In one embodiment, the PM_TC_instr_committed signal 644 is a registered version of the TC_instr_committed signal 124. Thus, the processor core 606 provides feedback about the issuance and execution of instructions for the various thread contexts and state of the thread contexts via the PM_TC_inst_issued 646, PM_TC_instr_committed 644, and PM_TC_state 642 inputs. Thus, the policy manager receives a variety of information that allows it to track power management operations. In particular, as discussed below, the use of power management threads can be tracked by the policy manager in a granular fashion to facilitate power management operations.

In one embodiment, the dispatch scheduler 602 also provides to the policy manager 604 a relax function, whose purpose is to enable the microprocessor 100 to save power when the application thread contexts do not require full processor bandwidth, without actually going to sleep. The relax function operates as if there is an additional thread context to be scheduled. However, when the relax thread context is selected for issue, the dispatch scheduler 602 does not issue an instruction.

Thus, the relax thread context can be viewed as a low power virtual thread. A relax thread context is a low power virtual thread in the sense that the thread is an additional thread to be scheduled, but it is not actually selected. That is, the dispatch scheduler specifies that no operation is performed in the pipeline position corresponding to the pipeline position of the low power virtual thread. For example, an ALU operation is not performed, data is not loaded, or some other operation is not performed at the pipeline position corresponding to the low power virtual thread, thereby conserving power. This power conservation is achieved without direct modulation of voltage and frequency parameters, as used in other power management techniques. Instead, voltage and frequency parameters are indirectly impacted by the operation of the low power virtual threads. The low power virtual threads enable the processor to lower its power consumption without actually going to sleep.

Thus, low power virtual threads may be invoked by the policy manager to facilitate power management tasks. The policy manager has a control mechanism for thread contexts. Therefore, this new form of thread, a low power virtual thread, allows the policy manager to operate with existing control techniques to effectuate power control. In other words, the low power virtual thread provides a new tool that can be used in connection with existing control techniques that do not relate to power management. Thus, a discrete power management technique, such as voltage and frequency scaling operations, is not required.

Figure 5:
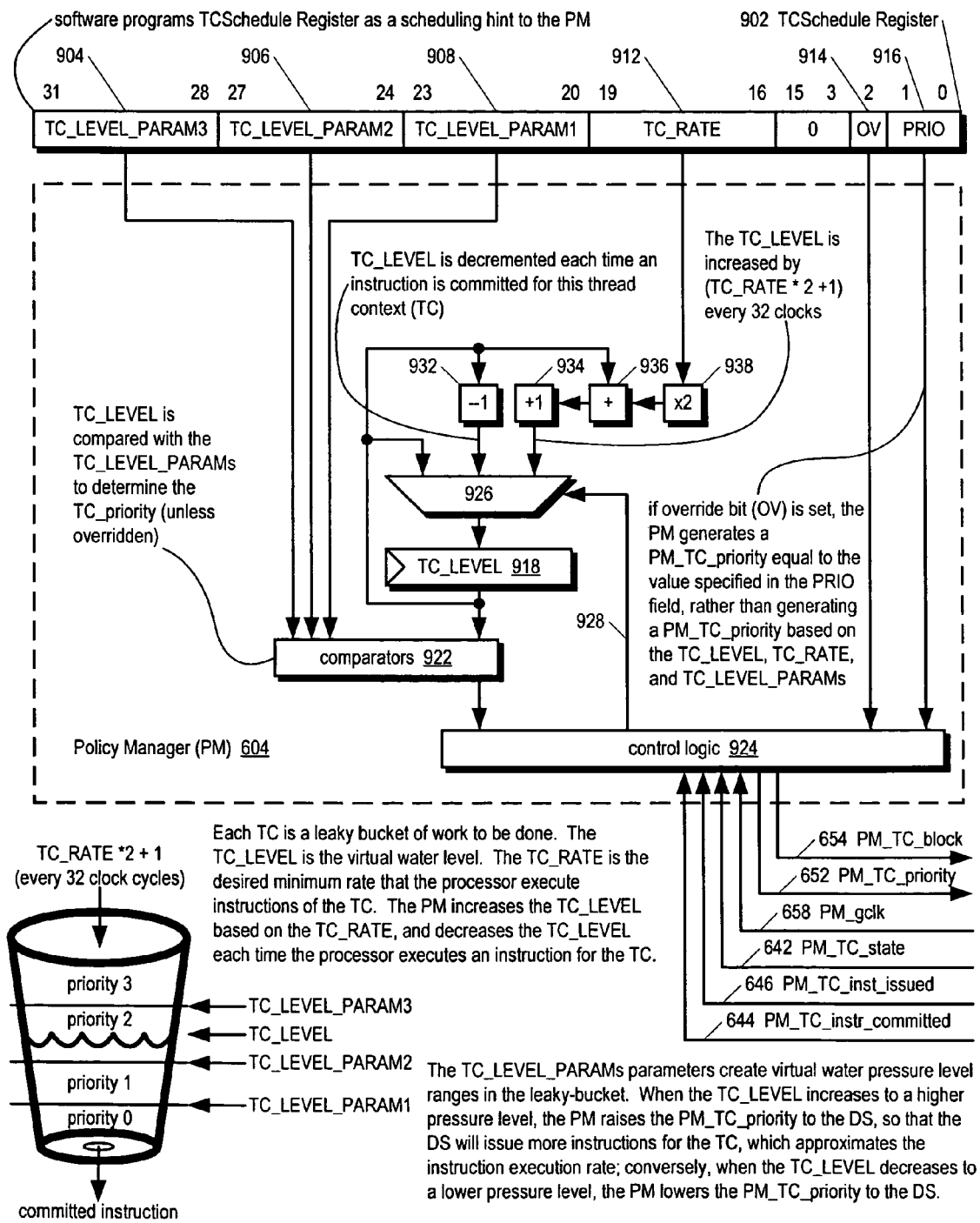
FIG. 5 illustrates a policy manager that may be used with the bifurcated scheduler of FIG. 2.

As shown in FIG. 5, which is discussed below, the policy manager 604 maintains a RELAX_LEVEL counter (per-VPE) that operates similar to the TC_LEVEL 918 counters described below, except that it uses a RELAX_RATE for incrementing and is decremented when a relaxed instruction slot completes. In one embodiment, the microprocessor 100 includes a VPESchedule register per-VPE similar to the TCSchedule register 902 that enables software to specify the RELAX_RATE. The relax function is enabled or disabled via the PM_vpe_relax_enable signals specified in Table 1, and the relax thread context priority is specified via the PM_vpe_relax_priority signals. These signals are software controllable. Thus, a software control module 660, shown in FIG. 2, may be used to establish a power performance metric and associated RELAX signals to implement the power performance metric, as further discussed below.

In one embodiment, the dispatch scheduler 602 also provides to the policy manager 604 an exception function, whose purpose is to enable an exception thread context to have its own independent priority from the normal thread contexts. The policy manager maintains an EXC_LEVEL counter (per-VPE) that operates similar to the TC_LEVEL 918 counters described below, except that it uses an EXC_RATE for incrementing and is decremented when an exception instruction slot completes. When the exception mode is enabled and an exception is taken for the VPE, then the thread contexts of the VPE will all be set to the exception priority. In one embodiment, software specifies the EXC_RATE via the VPESchedule registers. The exception function is enabled or disabled via the PM_vpe_exc_enable signals specified in Table 1, and the exception thread context priority is specified via the PM_vpe_exc_priority signals.

Figure 3:
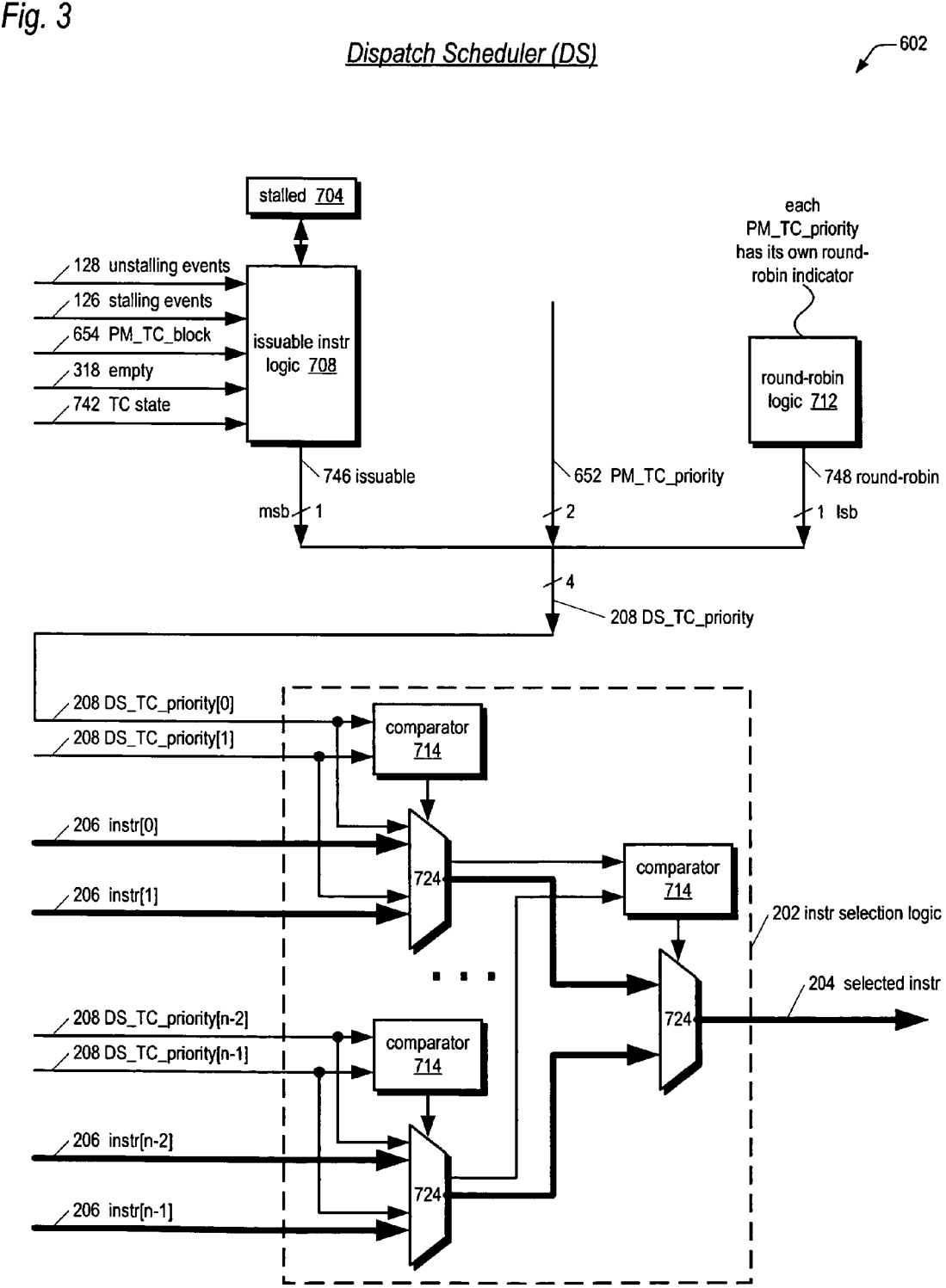
FIG. 3 illustrates a dispatch scheduler that may be used with the bifurcated scheduler of FIG. 2.

Referring now to FIG. 3, a block diagram illustrating in more detail the dispatch scheduler 602 of FIG. 2 and instruction selection logic 202 associated with instruction/skid buffers 106. The instruction selection logic 202 includes a tree of muxes 724 controlled by comparators 714. Each mux 724 receives an instruction 206 from two different thread contexts. Each mux 724 also receives the instruction's 206 associated DS_TC_priority 208. The comparator 714 associated with each mux 724 also receives the pair of DS_TC_priority signals for the two thread contexts and controls its associated mux 724 to select the instruction 206 and DS_TC_priority 208 with the highest DS_TC_priority 208 value. The selected instructions 206 and DS_TC_priorities 208 propagate down the tree until the final mux 724 selects the selected instruction 204 with the highest DS_TC_priority 208 for provision to the execution pipeline.

FIG. 3 shows logic of the dispatch scheduler 602, namely a stalled indicator 704, issuable instruction logic 708, and round-robin logic 712. In one embodiment, the stalled indicator 704 and issuable instruction logic 708 are replicated within the dispatch scheduler 602 for each thread context to generate a DS_TC_priority 208 for each thread context. In contrast, the round-robin logic 712 is instantiated once for each possible PM_TC_priority 652 and generates a round-robin indicator for each PM_TC_priority 652. For example, FIG. 3 illustrates an embodiment in which the policy manager 604 may specify one of four possible PM_TC_priorities 652; hence, the round-robin logic 712 is instantiated four times in the dispatch scheduler 602 and generates four respective round-robin indicators.

In one embodiment, the round-robin indicator includes one bit per thread context of the microprocessor 100. The bit of the round-robin indicator associated with its respective thread context is provided as round-robin bit 748. If the round-robin bit 748 is true, then it is the thread context's turn in the round-robin scheme to be issued among the other thread contexts that are currently at the same PM_TC_priority 652.

The issuable instruction logic 708 receives the unstalling events signal 128 and stalling events signal 126 from the execution units 114 of FIG. 1, the PM_TC_block 654 signal from the policy manager 604 of FIG. 2, an empty signal 318 from the instruction/skid buffer 106, and TC state 742 signals. In one embodiment, the TC state 742 signals convey similar information to the PM_TC_state 642 signals of FIG. 2. The issuable instruction logic 708 sets the stalled indicator 704 to mark the thread context stalled in response to a stalling events signal 126 that identifies the thread context. The issuable instruction logic 708 also stores state in response to the stalling event 126 to remember the cause of the stall. Conversely, the issuable instruction logic 708 clears the stalled indicator 704 in response to an unstalling events signal 128 if the unstalling event 128 is relevant to the cause of the stall. The issuable instruction logic 708 generates an issuable 746 signal in response to its inputs. The issuable 746 signal is true if the instruction 206 pointed to by the read pointer of the instruction/skid buffer 106 for the thread context is issuable. In one embodiment, an instruction is issuable if the TC state signals 742 indicate the thread context is in the Active state and is not blocked by other conditions (such as being Halted, Waiting, Suspended, or Yielded), the stalled indicator 704 is false, and the PM_TC_block 654 and empty 318 signals are false.

The issuable 746 bit, the PM_TC_priority 652 bits, and the round-robin bit 748 are combined to create the DS_TC_priority 208. In the embodiment of FIG. 3, the issuable bit 746 is the most significant bit, the round-robin bit 748 is the least significant bit, and the PM_TC_priority 652 is the two middle significant bits. As may be observed, because the issuable bit 746 is the most significant bit of the DS_TC_priority 652, a non-issuable instruction will be lower priority than all issuable instructions. Conversely, the round-robin bit 748 is only used to select a thread if more than one thread context has an issuable instruction and has the same highest PM_TC_priority 652.

Figure 4:
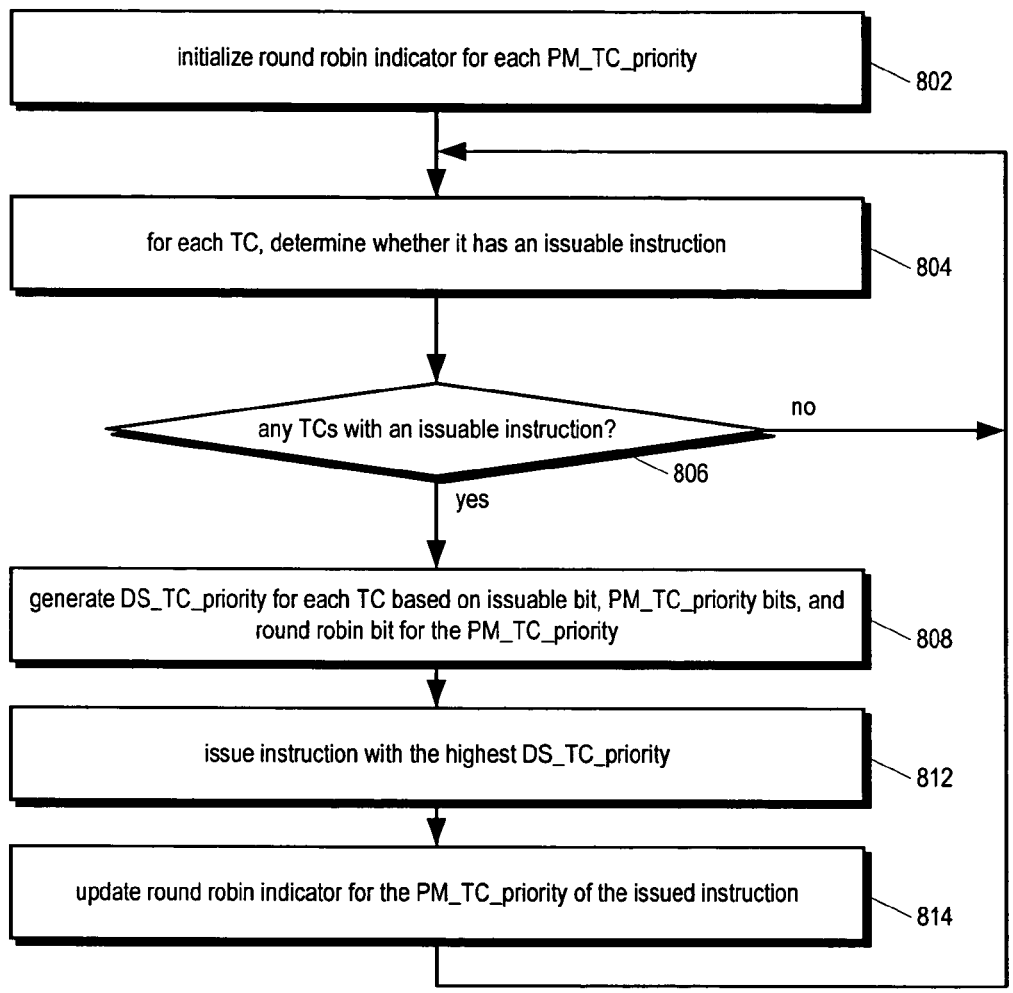
FIG. 4 illustrates processing operations associated with the dispatch scheduler of FIG. 3.

Referring now to FIG. 4, a flowchart illustrating operation of the dispatch scheduler 602 of FIG. 3 according to the present invention is shown. Flow begins at block 802.

At block 802, the dispatch scheduler 602 initializes each round-robin indicator for each PM_TC_priority 652. Flow proceeds to block 804.

At block 804, the dispatch scheduler 602 determines, for each thread context, whether the thread context has an issuable instruction 206. That is, the issuable instruction logic 708 for each thread context generates a value on the issuable 746 signal. In one embodiment, the issuable instruction logic 708 generates a true signal on the issuable 746 signal only if the TC state signals 742 indicate the thread context is in the Active state and is not blocked by other conditions (such as being Halted, Waiting, Suspended, or Yielded), the stalled indicator 704 is false, and the PM_TC_block 654 and empty 318 signals are false. Flow proceeds to decision block 806.

At decision block 806, the dispatch scheduler 602 determines, by examining the issuable 746 signal for each of the thread contexts, whether there are any thread contexts that have an issuable instruction 206. If not, flow returns to block 804 until at least one thread context has an issuable instruction 206; otherwise, flow proceeds to block 808.

At block 808, the dispatch scheduler 602 generates the DS_TC_priority 208 for the instruction 206 of each thread context based on the issuable 746 bit of the thread context, the PM_TC_priority 652 of the thread context, and the round-robin bit 748 of the PM_TC_priority 652 of the thread context. Flow proceeds to block 812.

At block 812, the dispatch scheduler 602 issues the instruction 206 with the highest DS_TC_priority 208. In other words, the dispatch scheduler 602 issues the instruction from the thread context that has an issuable instruction and has the highest PM_TC_priority 652. If multiple thread contexts meet that criteria, the dispatch scheduler 602 issues the instruction from the thread context whose turn it is to issue as indicated by the round-robin bit 748 for the PM_TC_priority 652 of the thread contexts. Flow proceeds to block 814.

At block 814, the round-robin logic 712 updates the round-robin indicator for the PM_TC_priority 652 based on which of the thread contexts was selected to have its instruction issued. Flow returns to block 804.

Referring now to FIG. 5, a block diagram illustrating the policy manager 604 of FIG. 2 and a TCSchedule register 902 according to the present invention is shown.

The microprocessor 100 includes a TCSchedule register 902 for each thread context. The TCSchedule register 902 is software-programmable and provides a means for software to provide a thread scheduling hint to the policy manager 604. In one embodiment, the TCSchedule register 902 is comprised within the Coprocessor 0 register discussed above with respect to FIG. 2 and Table 1, and in particular is comprised within the policy manager 604. The TCSchedule register 902 includes six fields: TC_LEVEL_PARAM1 908, TC_LEVEL_PARAM2 906, TC_LEVEL_PARAM3 904, TC_RATE 912, OV 914, and PRIO 916. In the embodiment of FIG. 5, the TC_LEVEL_PARAM1 908, TC_LEVEL_PARAM2 906, TC_LEVEL_PARAM3 904, and TC_RATE 912 fields comprise four bits, the PRIO 916 field comprises two bits, and the OV 914 field is a single bit.

The policy manager 604 logic shown in FIG. 5 comprises control logic 924; comparators 922 coupled to provide their output to the control logic 924; a TC_LEVEL 918 register coupled to provide its output as an input to the comparators 922; and a three-input mux 926 that is coupled to provide its output as the input to the TC_LEVEL 918 register. The mux 926 receives on its first input the output of the TC_LEVEL 918 register for retaining the correct value. The mux 926 receives on its second input the output of a decrementer 932 whose input is the output of the TC_LEVEL 918 register. The mux 926 receives on its third input the output of an incrementer 934 whose input is the output of an adder 936 that adds the output of the TC_LEVEL 918 register and the output of a multiplier 938 that multiplies the TC_RATE 912 by 2. The TC_RATE 912 is an indication of the desired execution rate of the thread context, i.e., the number of instructions to be completed per unit time. The software control module 660 may be used to specify a power performance metric, such as the TC_RATE 912 for a low power virtual thread. For example, the software control module 660 may be used to specify a power performance metric in the form of a limit on an instruction completion rate (e.g., a limit on instruction completion rate over hundreds to thousands of cycles) for a low power virtual thread. The power performance metric may be set for all threads or for individual threads, such as the low power virtual thread.

In the embodiment of FIG. 5, the TC_RATE 912 indicates the number of instructions of the thread that should be completed every 16 clock cycles. Although the logic just listed is shown only once in FIG. 5, the logic is replicated within the policy manager 604 for each thread context to generate the PM_TC_block 654 and PM_TC_priority 652 signals and to receive the PM_TC_state 642, PM_TC_inst_committed 644, PM_TC_inst_issued 646, and PM_gclk 658 signals for each thread context.

The policy manager 604 employs a modified leaky-bucket algorithm to accomplish the high-level thread scheduling policy of the scheduler 108. The TC_LEVEL 918 register is analogous to the water level in a bucket. The TC_LEVEL 918 is essentially a measure of the amount of work that needs to be done by the thread context. In one embodiment, the TC_LEVEL 918 register comprises a 12-bit register initialized to zero. The control logic 924 generates a control signal 928 to control which input the mux 926 selects. Every 32 clock cycles, the mux 926 selects the output of the incrementer 936 for storing in the TC_LEVEL 918 register, which increases the TC_LEVEL 918 by the quantity (TC_RATE*2+1). In one embodiment, the number of clock cycles between updates of the TC_LEVEL 918 based on the TC_RATE 912 is also programmable. On other clock cycles, the mux 926 selects the output of the decrementer 932 to decrement the TC_LEVEL 918 if the PM_TC_instr_committed signal 644 indicates an instruction for the thread context has been committed for execution. Thus, software can affect the virtual water level in the thread context's bucket by adjusting the TC_RATE 912 value of the thread's TCSchedule register 902. In the embodiment of FIG. 5, the value of the TC_RATE 912 indicates the number of instructions per 16 clock cycles it is desired for the microprocessor 100 to execute for the thread context.

As the water level in a leaky bucket increases, so does the water pressure, which causes the water to leak out at a higher rate. Analogously, the TC_LEVEL_PARAM fields 904/906/908 are programmed with monotonically increasing values that define virtual water pressure ranges. The comparators 922 compare the TC_LEVEL 918 with the TC_LEVEL_PARAMs 904/906/908 and provide their result to the control logic 924, which generates the PM_TC_priority 652 based on which of the virtual water pressure ranges the TC_LEVEL 918 falls in. As illustrated by the leaky bucket of FIG. 5, the control logic 924 generates a PM_TC_priority 652 value of 3 (the highest priority) if the most significant nibble of the TC_LEVEL 918 is above the TC_LEVEL_PARAM3 904 value; the control logic 924 generates a PM_TC_priority 652 value of 2 if the most significant nibble of the TC_LEVEL 918 is between the TC_LEVEL_PARAM3 904 value and the TC_LEVEL_PARAM2 906 value; the control logic 924 generates a PM_TC_priority 652 value of 1 if the most significant nibble of the TC_LEVEL 918 is between the TC_LEVEL_PARAM2 906 value and the TC_LEVEL_PARAM1 908 value; and the control logic 924 generates a PM_TC_priority 652 value of 0 (the lowest priority) if the most significant nibble of the TC_LEVEL 918 is below the TC_LEVEL_PARAM1 908 value. Analogously, increasing the PM_TC_priority 652 level increases the pressure on the dispatch scheduler 602 to issue instructions for the thread context, while decreasing the PM_TC_priority 652 level decreases the pressure on the dispatch scheduler 602 to issue instructions for the thread context.

As discussed above, in some applications using the microprocessor 100, different threads may require different instruction execution rates, which is programmable using the TC_RATE 912 field. Thus, the TC_RATE 912 may be set by the software control module 660 to tune power management performance associated with one or more low power virtual threads. Power management in accordance with the invention can be effectuated through the use of a single low power virtual thread. Alternately, power management can be effectuated through the use of multiple low power virtual threads.

Furthermore, different threads may require different resolutions, i.e., the period of time over which the instruction execution rate is measured. That is, some threads, although perhaps not requiring a high execution rate, may not be starved for instruction execution beyond a minimum time period. That is, the thread requires a particular quality-of-service. The software control module 660 may rely upon quality-of-service parameters linked to one or more low power virtual threads to tune power management performance.

As may be observed from FIG. 5 and the explanation thereof, the TC_LEVEL_PARAMs 904/906/908 may be employed to accomplish a required resolution for each thread. By assigning TC_LEVEL_PARAMs 904/906/908 that are relatively close to one another, a higher resolution may be accomplished; whereas, assigning TC_LEVEL_PARAMs 904/906/908 that are relatively far apart, creates a lower resolution. Thus, software may achieve the desired quality-of-service goals via the policy manager 604 by adjusting the TC_LEVEL_PARAMs 904/906/908 for each thread context to achieve the needed resolution on the instruction execution rate.

If the OV bit 914 is set, the control logic 924 ignores the values of the TC_LEVEL_PARAMs 904/906/908, TC_RATE 912, and TC_LEVEL 918, and instead generates a value on the PM_TC_priority 652 signal equal to the value specified in the PRIO field 916. This allows software to bypass the leaky bucket policy and directly control the priority of one or more of the thread contexts, if necessary.

In one embodiment, if the TC_LEVEL 918 saturates to its maximum value for a predetermined number of clock cycles, then the microprocessor 100 signals an interrupt to enable software to make thread scheduling adjustments at a higher level, in particular by changing the values in one or more of the TCSchedule registers 902. In one embodiment, the interrupt may be masked by software.

In one embodiment, the microprocessor 100 instruction set includes a YIELD instruction, which a thread context may execute to instruct the scheduler 108 to stop issuing instructions for the thread context until a specified event occurs. In one embodiment, when a thread is YIELDed, the policy manager 604 temporarily disables updates of the thread's TC_LEVEL 918 so that the thread's PM_TC_priority is preserved until the thread becomes unYIELDed. In another embodiment, the policy manager 604 continues to update the thread's TC_LEVEL 918, likely causing the thread's PM_TC_priority to increase, such that when the thread becomes unYIELDed it will temporarily have a high priority to aid the thread in essentially priming its pump. In one embodiment, the behavior of the policy manager 604 toward a YIELDed thread is programmable by software.

It should be understood that although an embodiment is described in which specific numbers of bits are used to specify the PM_TC_priority 652, TC_LEVEL_PARAMs 904/906/908, TC_RATE 912, TC_LEVEL 918, etc., the scheduler 108 is not limited in any way to the values used in the embodiment; rather, the scheduler 108 may be configured to use various different number of bits, priorities, levels, rates, etc. as required by the particular application in which the microprocessor 100 is to be used. Furthermore, although a policy manager 604 has been described which employs a modified leaky-bucket thread scheduling policy, it should be understood that the policy manager 604 may be configured to employ any of various thread scheduling policies while still enjoying the benefits of a bifurcated scheduler 108. The low power virtual threads of the invention may be successfully implemented with any number of scheduling policies. For example, in one embodiment, the policy manager 604 employs a simple round-robin thread scheduling policy in which the PM_TC_priority 652 outputs for all the thread contexts are tied to the same value. In another embodiment, the policy manager 604 employs a time-sliced thread scheduling policy in which the PM_TC_priority 652 output is raised to the highest priority for one thread context for a number of consecutive clock cycles specified in the TCSchedule register 902 of the thread context, then the PM_TC_priority 652 output is raised to the highest priority for another thread context for a, perhaps different, number of consecutive clock cycles specified in the TCSchedule register 902 of the thread context, and so on for each thread context in a time-sliced fashion.

In one embodiment, the microprocessor 100 instruction set includes a FORK instruction for allocating an available thread context and scheduling execution of a new thread within the newly allocated thread context. In one embodiment, when a thread context FORKs a new thread context, the TC_RATE 912 for the parent thread context is split between itself and the child thread context evenly, i.e., the new TC_RATE 912 is the old TC_RATE 912 divided by two. This has the advantage of preventing a thread context from requesting more processing bandwidth than originally allotted.

As may be observed from the foregoing, bifurcating the scheduler 108 enables the dispatch scheduler 602, which is included in the processor core 606, to be relatively simple, which enables the dispatch scheduler 602 to be relatively small in terms of area and power, and places the application-specific complexity of the thread scheduling policy in the policy manager 604, which is outside the processor core 606. This is advantageous since some applications may not require a complex policy manager 604 and can therefore not be burdened with the additional area and power requirements that would be imposed upon all applications if the scheduler 108 were not bifurcated, as described herein.

Figure 6:
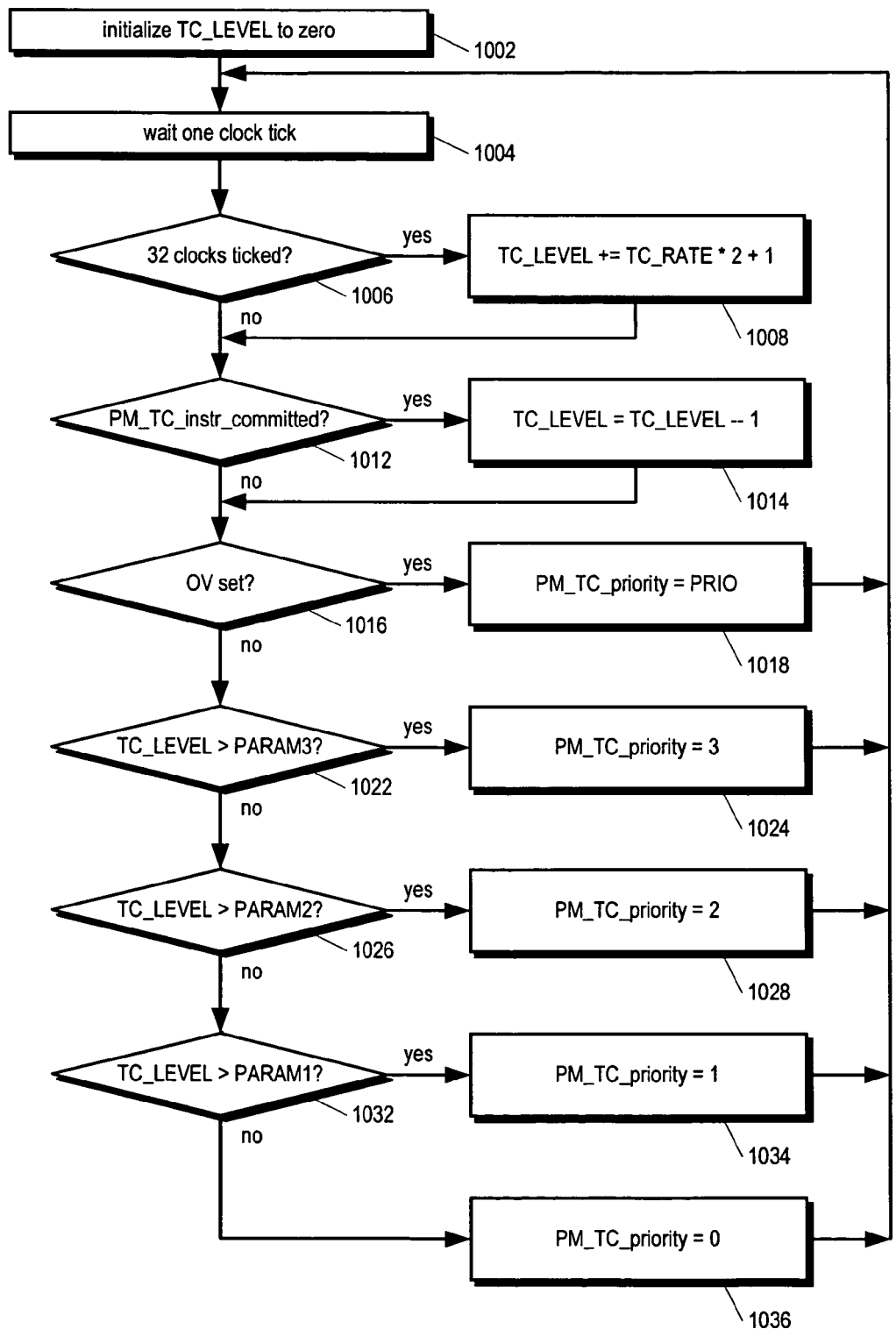
FIG. 6 illustrates processing operations associated with the policy manager of FIG. 5.

Referring now to FIG. 6, a flowchart illustrating operation of the policy manager 604 of FIG. 5 according to the present invention is shown. Although operation is shown for only a single thread context in FIG. 6, the operation specified in FIG. 6 occurs within the policy manager 604 for each thread context. Flow begins at block 1002.

At block 1002, the policy manager 604 initializes the TC_LEVEL 918 to zero. Flow proceeds to block 1004.

At block 1004, the policy manager 604 waits one cycle of the PM_gclk 658. Flow proceeds to decision block 1006.

At decision block 1006, the policy manager 604 determines whether 32 PM_gclks 658 have ticked since the last time flow arrived at decision block 1006. If not, flow proceeds to decision block 1012; otherwise, flow proceeds to block 1008.

At block 1008, the TC_LEVEL 918 is increased by twice the value of TC_RATE 912 plus one. Flow proceeds to decision block 1012.

At decision block 1012, the policy manager 604 determines whether PM_TC_instr_committed 644 is true. If not, flow proceeds to decision block 1016; otherwise, flow proceeds to block 1014.

At block 1014, the TC_LEVEL 918 is decremented. Flow proceeds to decision block 1016.

At decision block 1016, the policy manager 604 determines whether the OV bit 914 is set. If not, flow proceeds to decision block 1022; otherwise, flow proceeds to block 1018.

At block 1018, the policy manager 604 generates a value on PM_TC_priority 652 equal to the value of the PRIO 916 field. Flow returns to block 1004.

At decision block 1022, the policy manager 604 determines whether the TC_LEVEL 918 is greater than the TC_LEVEL_PARAM3 904 value. If not, flow proceeds to decision block 1026; otherwise, flow proceeds to block 1024.

At block 1024, the policy manager 604 generates a value of 3 (the highest priority) on PM_TC_priority 652. Flow returns to block 1004.

At decision block 1026, the policy manager 604 determines whether the TC_LEVEL 918 is greater than the TC_LEVEL_PARAM2 906 value. If not, flow proceeds to decision block 1032; otherwise, flow proceeds to block 1028.

At block 1028, the policy manager 604 generates a value of 2 on PM_TC_priority 652. Flow returns to block 1004.

At decision block 1032, the policy manager 604 determines whether the TC_LEVEL 918 is greater than the TC_LEVEL_PARAM1 908 value. If not, flow proceeds to block 1036; otherwise, flow proceeds to block 1034.

At block 1034, the policy manager 604 generates a value of 1 on PM_TC_priority 652. Flow returns to block 1004.

At block 1036, the policy manager 604 generates a value of 0 (lowest priority) on PM_TC_priority 652. Flow returns to block 1004.

Thus, the policy manager, in connection with the software control module 660, provides a mechanism for power management. Unlike direct voltage or frequency scaling techniques used to manage power, the disclosed technique is embedded with the processing of multiple threads. The technique relies upon existing thread control techniques to achieve new power management options. For example, instead of halting operations, such as by using a WAIT instruction, the technique of the invention allows continuous, fine-grained (e.g., cycle-by-cycle) control of power consumption.

The software control module 660 may be used to provide high-level power management. For example, using the software control module 660, one may specify a power performance metric and then compare operating results to a power performance goal. The policy manager provides an interface and control information to achieve such functionality. Advantageously, this functionality is achieved without altering the dispatch scheduler 602 of the processor core 606.

Various alternate embodiments of the invention may also be implemented. For example, the power performance metric may be processed by the policy manager to shut down selected threads instead of invoking low power virtual threads. The disclosed policy manager allows cycle-by-cycle control of individual threads and therefore provides granular power management resolution.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention.

For example, in addition to the low power virtual threads implemented in hardware (e.g., within or coupled to a Central Processing Unit ("CPU"), microprocessor, microcontroller, digital signal processor, processor core, System on Chip ("SOC"), or any other programmable device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), GDSII databases, hardware description languages (HDL) including Verilog HDL, VHDL, and so on, or other available programs, databases, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A processor, comprising:
a software control module specifying a power performance metric;
a policy manager responsive to said software control module; and
a dispatch scheduler responsive to said policy manager to operate said processor in accordance with said power performance metric;
wherein said dispatch scheduler is within the core of said processor and said policy manager is a customizable multi-thread scheduling unit outside the core of said processor;
wherein said policy manager specifies a low power virtual thread responsive to said power performance metric, said dispatch scheduler scheduling said low power virtual thread but never selecting said low power virtual thread;
wherein said policy manager instructs selected threads to be shut down in response to said power performance metric and said dispatch scheduler shuts down said selected threads.

2. The processor of claim 1 wherein said power performance metric is an instructions per unit time parameter.

3. The processor of claim 1 wherein said policy manager tracks the operation of said low power virtual thread.

4. The processor of claim 1 wherein said dispatch scheduler specifies that no operations are performed in pipeline positions corresponding to pipeline positions of said low power virtual thread.

5. A processor, comprising:
a software control module specifying a power performance metric;
a policy manager responsive to said software control module; and
a dispatch scheduler responsive to said policy manager to operate said processor in accordance with said power performance metric;
wherein said dispatch scheduler is within the core of said processor and said policy manager is a customizable multi-thread scheduling unit outside the core of said processor;
wherein said policy manager instructs selected threads to be shut down in response to said power performance metric and said dispatch scheduler shuts down said selected threads.

6. The processor of claim 5 wherein said policy manager instructs selected threads to be shut down on a cycle-by-cycle basis.

7. A processor, comprising:
a software control module specifying a power performance metric;
a bifurcated thread scheduler including a multi-thread internal processor core component and a customizable multi-thread external processor core component in direct communication with said software control module, said bifurcated thread scheduler operating said processor in accordance with said power performance metric;
wherein said customizable multi-thread external processor core component specifies a low power virtual thread responsive to said power performance metric, said multi-thread internal processor core component scheduling said low power virtual thread but never selecting said low power virtual thread.

8. The processor of claim 7 wherein said power performance metric is an instructions per unit time parameter.

9. The processor of claim 7 wherein said customizable multi-thread external processor core component tracks the operation of said low power virtual thread.

10. The processor of claim 7 wherein said multi-thread internal processor core component specifies that no operations are performed in pipeline positions corresponding to pipeline positions of said low power virtual thread.

11. A processor, comprising:
a software control module specifying a power performance metric;
a bifurcated thread scheduler including a multi-thread internal processor core component and a customizable multi-thread external processor core component in direct communication with said software control module, said bifurcated thread scheduler operating said processor in accordance with said power performance metric;
wherein said customizable multi-thread external processor core component instructs selected threads to be shut down in response to said power performance metric and said multi-thread internal processor core shuts down said selected threads.

12. The processor of claim 11 wherein said customizable multi-thread external processor core component instructs selected threads to be shut down on a cycle-by-cycle basis.

13. A method of operating a processor, comprising:
specifying a power performance metric via software control;
responding to said power performance metric at a customizable multi-thread external processor core component; and
implementing said power performance metric with a multi-thread internal processor core component responsive to said customizable multi-thread external processor core component;
wherein responding includes specifying a low power virtual thread responsive to said power performance metric, and implementing includes scheduling said low power virtual thread but never selecting said low power virtual thread.

14. The method of claim 13 wherein specifying includes specifying an instructions per unit time parameter.

15. The method of claim 13 further comprising stopping operations in pipeline positions corresponding to pipeline positions of said low power virtual thread.

16. A method of operating a processor, comprising:
specifying a power performance metric via software control;
responding to said power performance metric at a customizable multi-thread external processor core component; and
implementing said power performance metric with a multi-thread internal processor core component responsive to said customizable multi-thread external processor core component;
wherein responding includes instructing selected threads to be shut down in response to said power performance metric, wherein responding includes instructing selected threads to be shut down on a cycle-by-cycle basis.

17. A computer readable storage medium, comprising executable instructions to:
define a policy manager responsive to a power performance metric from a software control module, wherein said policy manager is a customizable multi-thread scheduling unit outside the core of a processor; and
specify a dispatch scheduler within said core of said processor to be responsive to said policy manager to operate in accordance with said power performance metric;
wherein said executable instructions to define a policy manager include executable instructions to specify a low power virtual thread responsive to said power performance metric, and wherein said executable instructions to specify a dispatch scheduler include executable instructions to specify a dispatch scheduler to schedule said low power virtual thread but never select said low power virtual thread.

18. The computer readable storage medium of claim 17 wherein said executable instructions to define a policy manager include executable instructions to define a policy manager that tracks the operation of said low power virtual thread.

19. The computer readable storage medium of claim 17 wherein said executable instructions to specify a dispatch scheduler include executable instructions to specify a dispatch scheduler that specifies that no operations are performed in pipeline positions corresponding to pipeline positions of said low power virtual thread.

20. A method of enabling a computer to generate a processor, comprising:
selecting executable instructions that
define a policy manager responsive to a power performance metric from a software control module, wherein the policy manager is a customizable multi-thread scheduling unit outside the core of said processor; and
specify a dispatch scheduler responsive to said policy manager to operate a processor in accordance with said power performance metric, wherein said dispatch scheduler is within the core of said processor; and
transmitting said executable instructions over a network to a designated computer;
wherein selecting executable instructions includes selecting executable instructions that define a policy manager that specifies a low power virtual thread responsive to said power performance metric, and wherein selecting executable instructions includes selecting executable instructions that specify a dispatch scheduler to schedule said low power virtual thread but never select said low power virtual thread.

21. The method of claim 20 wherein selecting executable instructions includes selecting executable instructions to define a policy manager that tracks the operation of said low power virtual thread.

22. The method of claim 20 wherein selecting executable instructions includes selecting executable instructions to specify a dispatch scheduler that specifies that no operations are performed in pipeline positions corresponding to pipeline positions of said low power virtual thread.

* * * * *